US012768311B2

(12) United States Patent
Sarwar et al.

(10) Patent No.: US 12,768,311 B2
(45) Date of Patent: Oct. 20, 2026

(54) SYSTEMS AND METHODS FOR MIGITATING COLD START EMISSIONS IN A VEHICLE INCLUDING A CATALYST HEATER VIA ROTATION OF A TURBOCHARGER TURBINE

(71) Applicant: GM GLOBAL TECHNOLOGY OPERATIONS LLC, Detroit, MI (US)

(72) Inventors: Azeem Sarwar, Rochester Hills, MI (US); Mark Claywell, Birmingham, MI (US); Maqsood Rizwan Ali Khan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 79 days.

(21) Appl. No.: 18/904,961

(22) Filed: Oct. 2, 2024

(65) Prior Publication Data

US 2026/0092571 A1 Apr. 2, 2026

(51) Int. Cl.
*F02D 41/06* (2006.01)
*F01N 3/20* (2006.01)
*F02D 41/00* (2006.01)

(52) U.S. Cl.
CPC ......... *F02D 41/064* (2013.01); *F01N 3/2006* (2013.01); *F02D 41/0007* (2013.01)

(58) Field of Classification Search
CPC ... F02D 41/064; F02D 41/0007; F01N 3/2006
See application file for complete search history.

(56) References Cited

U.S. PATENT DOCUMENTS 10,138,833 B1 * 11/2018 Kurtz ...................... F02D 41/26
2015/0113980 A1 * 4/2015 Ruona .................. F02B 37/183 903/905
2020/0102874 A1 * 4/2020 Kurtz ................. F02D 41/1441
2023/0193860 A1 * 6/2023 Kemmerling ......... F01N 3/2892 60/605.2

FOREIGN PATENT DOCUMENTS

DE 102018129955 A1 5/2020
DE 102020004717 A1 2/2022

* cited by examiner

*Primary Examiner* — Scott A Browne
*Assistant Examiner* — Lidia Kwiatkowska
(74) *Attorney, Agent, or Firm* — Ingrassia Fisher & Lorenz, LLP | IFL

(57) ABSTRACT

Control signals are issued to open a wastegate, rotate a turbine, and turn on a catalyst heater disposed between the turbine and a catalyst in response to a trigger signal. The rotation of the turbine causes recirculated air flow in a recirculation flow path including an exhaust manifold, exhaust walls between the exhaust manifold and the turbine, a turbine housing, exhaust walls between the turbine and the wastegate, exhaust walls between the wastegate and the exhaust manifold, and exhaust walls between the turbine and the catalyst heater. Heat is transferred from the recirculated air heated by the catalyst heater to the exhaust manifold, the exhaust walls between the exhaust manifold and the turbine, the turbine housing, the exhaust walls between the turbine and the wastegate, the exhaust walls between the wastegate and the exhaust manifold, and the exhaust walls between the turbine and the catalyst heater.

17 Claims, 8 Drawing Sheets

SYSTEMS AND METHODS FOR MIGITATING COLD START EMISSIONS IN A VEHICLE INCLUDING A CATALYST HEATER VIA ROTATION OF A TURBOCHARGER TURBINE

INTRODUCTION

The technical field generally relates to vehicles, and more particularly relates to systems and methods for mitigating cold start emissions in a vehicle including a catalyst heater via rotation of a turbocharger turbine.

Vehicles that include internal combustion engines generate exhaust gases as a by-product of a combustion process. Such vehicles often rely on a catalyst in a catalytic converter to process the exhaust gases prior to release of the processed exhaust gases as emissions from the vehicle, Catalyst typically need to reach an operating temperature to effectively process exhaust gases. The operating temperature is referred to as a catalyst light-off temperature. The catalyst light-off temperature is generally about midway to maximum conversion efficiency temperatures, such as for example 300° C. The maximum conversion efficiency temperature may, for example, be 500° C., A cold-start of an engine occurs when a vehicle is started after the engine has been turned off for several hours. At cold start-up, the vehicle may emit excessive emissions until the catalyst reaches the catalyst light-off temperature, Accordingly, it is desirable to provide systems and methods for systems and methods for mitigating cold start emissions in a vehicle including a catalyst heater via rotation of a turbocharger turbine. Other desirable features and characteristics will become apparent from the subsequent detailed description and the appended claims, taken in conjunction with the accompanying drawings and the foregoing technical field and background.

SUMMARY

A method of mitigating cold start emissions in a vehicle including a catalyst heater via rotation of turbocharger turbine includes: receiving, at a controller, a trigger signal from a trigger signal source of the vehicle; issuing by the controller, a first control signal to a wastegate actuator to open a wastegate responsive to the trigger signal; issuing by the controller, a second control signal to a turbo shaft actuator to rotate a turbine of a turbocharger responsive to the trigger signal; and issuing by the controller, a third control signal to the catalyst heater to turn on the catalyst heater responsive to the trigger signal, the catalyst heater being disposed between the turbine and a catalyst, wherein: the rotation of the turbine causes recirculated air to flow in a recirculation flow path and/or flow path through the catalyst; the recirculation flow path includes an exhaust manifold, exhaust walls between the exhaust manifold and the turbine, a turbine housing of the turbine, exhaust walls between the turbine and the wastegate, exhaust walls between the wastegate and the exhaust manifold, and exhaust walls between the turbine and the catalyst heater; the recirculated air is heated by the catalyst heater; and heat is transferred from the heated recirculated air to the exhaust manifold, the exhaust walls between the exhaust manifold and the turbine, the turbine housing of the turbine, the exhaust walls between the turbine and the wastegate, the exhaust walls between the wastegate and the exhaust manifold, and the exhaust walls between the turbine and the catalyst heater.

In at least one embodiment, receiving at the controller, the trigger signal includes receiving an engine turn on signal.

In at least one embodiment, issuing by the controller, the first control signal to the wastegate actuator to open the wastegate includes issuing by the controller, the first control signal to the wastegate actuator to fully open the wastegate.

In at least one embodiment, the method further includes issuing by the controller a fourth command to a variable valve timing (VVT) system to at least partially open an intake valve and an exhaust valve of at least one of a plurality of cylinders of an internal combustion engine.

In at least one embodiment, the method further includes issuing a fifth command to an electric motor comprising at least one of a P0 electric motor, a P1 electric motor, and a P2 electric motor to position a crankshaft where at least one of a plurality of cylinders has intake and exhaust valves in an overlap condition.

In at least one embodiment, the method further includes issuing, by the controller, a sixth control signal to an exhaust gas recirculation (EGR) valve actuator to open an EGR valve in response to the trigger signal.

In at least one embodiment, the method further includes issuing, by the controller, a seventh control signal to a compressor bypass valve actuator to open a compressor bypass valve responsive to the trigger signal.

In at least one embodiment, the recirculation flow path includes the exhaust manifold, the exhaust walls between the exhaust manifold and the turbine, the turbine housing of the turbine, the exhaust walls between the turbine and the catalyst heater, exhaust walls between the catalyst heater and the wastegate, the exhaust walls between the wastegate and the exhaust manifold, and exhaust walls between the catalyst heater and the catalyst; the recirculation flow path is adjacent a first side of the catalyst; and heat is transferred from the heated recirculated air to the exhaust manifold, the exhaust walls between the exhaust manifold and the turbine, the turbine housing of the turbine, the exhaust walls between the turbine and the catalyst heater, the exhaust walls between the catalyst heater and the wastegate, the exhaust walls between the wastegate and the exhaust manifold, the exhaust walls between the catalyst heater and the catalyst, and the catalyst via the first side of the catalyst.

In at least one embodiment, the catalyst includes a first catalyst brick and a second catalyst brick; the recirculation flow path includes the exhaust manifold, the exhaust walls between the exhaust manifold and the turbine, the turbine housing of the turbine, the exhaust walls between the turbine and the catalyst heater, exhaust walls between the catalyst heater and the first catalyst brick, exhaust walls between the first catalyst brick and the wastegate, and the exhaust walls between the wastegate and the exhaust manifold; the second catalyst brick is disposed outside the recirculation flow path; and heat is transferred from the heated recirculated air to the exhaust manifold, the exhaust walls between the exhaust manifold and the turbine, the turbine housing of the turbine, the exhaust walls between the turbine and the catalyst heater, the exhaust walls between the catalyst heater and the first catalyst brick, the exhaust walls between the first catalyst brick and the wastegate, the exhaust walls between the wastegate and the exhaust manifold, and the first catalyst brick.

In at least one embodiment, the first catalyst brick includes an oxidation catalyst.

In at least one embodiment, the turbo shaft actuator is a motor generator unit (MGU).

A system for mitigating cold start emissions generated by a vehicle including a catalyst heater via rotation of turbocharger turbine includes at least one processor; and at least one memory communicatively coupled to the at least one processor. The at least one memory includes instructions that upon execution by the at least one processor, causes the at least one processor to: receive a trigger signal from a trigger signal source of the vehicle; issue a first control signal to a wastegate actuator to open a wastegate responsive to the trigger signal; issue a second control signal to a turbo shaft actuator to rotate a turbine of a turbocharger responsive to the trigger signal; and issue a third control signal to the catalyst heater to turn on the catalyst heater responsive to the trigger signal, the catalyst heater being disposed between the turbine and a catalyst, wherein: the rotation of the turbine causes recirculated air to flow in a recirculation flow path and/or flow path through the catalyst; the recirculation flow path includes an exhaust manifold, exhaust walls between the exhaust manifold and the turbine, a turbine housing of the turbine, exhaust walls between the turbine and the wastegate, exhaust walls between the wastegate and the exhaust manifold, and exhaust walls between the turbine and the catalyst heater; the recirculated air is heated by the catalyst heater; and heat is transferred from the heated recirculated air to the exhaust manifold, the exhaust walls between the exhaust manifold and the turbine, the turbine housing of the turbine, the exhaust walls between the turbine and the wastegate, the exhaust walls between the wastegate and the exhaust manifold, and the exhaust walls between the turbine and the catalyst heater.

In at least one embodiment, the at least one memory further includes instructions that upon execution by the at least one processor, causes the at least one processor to receive the trigger signal, the trigger signal including an engine turn on signal.

In at least one embodiment, the at least one memory further includes instructions that upon execution by the at least one processor, causes the at least one processor to issue a fourth command to a variable valve timing (VVT) system to at least partially open an intake valve and an exhaust valve of at least one of a plurality of cylinders of an internal combustion engine.

In at least one embodiment, the at least one memory further includes instructions that upon execution by the at least one processor, causes the at least one processor to issue a fifth command to an electric motor comprising at least one of a P0 electric motor, a P1 electric motor, and a P2 electric motor to position a crankshaft where at least one of a plurality of cylinders has intake and exhaust valves in an overlap condition.

In at least one embodiment, the at least one memory further includes instructions that upon execution by the at least one processor, causes the at least one processor to issue a sixth control signal to an exhaust gas recirculation (EGR) valve actuator to open an EGR valve in response to the trigger signal.

In at least one embodiment, the at least one memory further includes instructions that upon execution by the at least one processor, causes the at least one processor to issue a seventh control signal to a compressor bypass valve actuator to open a compressor bypass valve responsive to the trigger signal.

In at least one embodiment, the recirculation flow path includes the exhaust manifold, the exhaust walls between the exhaust manifold and the turbine, the turbine housing of the turbine, the exhaust walls between the turbine and the catalyst heater, exhaust walls between the catalyst heater and the wastegate, the exhaust walls between the wastegate and the exhaust manifold, and exhaust walls between the catalyst heater and the catalyst; the recirculation flow path is adjacent a first side of the catalyst; and heat is transferred from the heated recirculated air to the exhaust manifold, the exhaust walls between the exhaust manifold and the turbine, the turbine housing of the turbine, the exhaust walls between the turbine and the catalyst heater, the exhaust walls between the catalyst heater and the wastegate, the exhaust walls between the wastegate and the exhaust manifold, the exhaust walls between the catalyst heater and the catalyst, and the catalyst via the first side of the catalyst.

In at least one embodiment, the catalyst includes a first catalyst brick and a second catalyst brick; the recirculation flow path includes the exhaust manifold, the exhaust walls between the exhaust manifold and the turbine, the turbine housing of the turbine, the exhaust walls between the turbine and the catalyst heater, exhaust walls between the catalyst heater and the first catalyst brick, exhaust walls between the first catalyst brick and the wastegate, and the exhaust walls between the wastegate and the exhaust manifold; the second catalyst brick is disposed outside the recirculation flow path; and heat is transferred from the heated recirculated air to the exhaust manifold, the exhaust walls between the exhaust manifold and the turbine, the turbine housing of the turbine, the exhaust walls between the turbine and the catalyst heater, the exhaust walls between the catalyst heater and the first catalyst brick, the exhaust walls between the first catalyst brick and the wastegate, the exhaust walls between the wastegate and the exhaust manifold, and the first catalyst brick.

A vehicle including a cold start emissions mitigation system includes at least one processor and at least one memory communicatively coupled to the at least one processor. The at least one memory includes instructions that upon execution by the at least one processor, causes the at least one processor to: receive a trigger signal from a trigger signal source of the vehicle; issue a first control signal to a wastegate actuator to open a wastegate responsive to the trigger signal; issue a second control signal to a turbo shaft actuator to rotate a turbine of a turbocharger responsive to the trigger signal; and issue a third control signal to the catalyst heater to turn on the catalyst heater responsive to the trigger signal, the catalyst heater being disposed between the turbine and a catalyst, wherein: the rotation of the turbine causes recirculated air to flow in a recirculation flow path and/or flow path through the catalyst; the recirculation flow path includes an exhaust manifold, exhaust walls between the exhaust manifold and the turbine, a turbine housing of the turbine, exhaust walls between the turbine and the wastegate, exhaust walls between the wastegate and the exhaust manifold, and exhaust walls between the turbine and the catalyst heater; the recirculated air is heated by the catalyst heater; and heat is transferred from the heated recirculated air to the exhaust manifold, the exhaust walls between the exhaust manifold and the turbine, the turbine housing of the turbine, the exhaust walls between the turbine and the wastegate, the exhaust walls between the wastegate and the exhaust manifold, and the exhaust walls between the turbine and the catalyst heater; issue a second control signal to a turbo shaft actuator to rotate a turbine of a turbocharger, wherein the rotation of the turbine causes recirculated air to flow in a recirculation flow path including an exhaust manifold, the turbine, an exhaust wall system, and the wastegate, wherein: the exhaust wall system includes a turbine housing of the turbine, exhaust walls disposed between the turbine and the wastegate, and exhaust walls disposed between the turbine and a catalyst brick; at least a portion of the recirculation flow path is adjacent a side of the catalyst brick; and heat transfer occurs from the recirculated air to the exhaust wall system and to the catalyst brick via the side of the catalyst brick.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
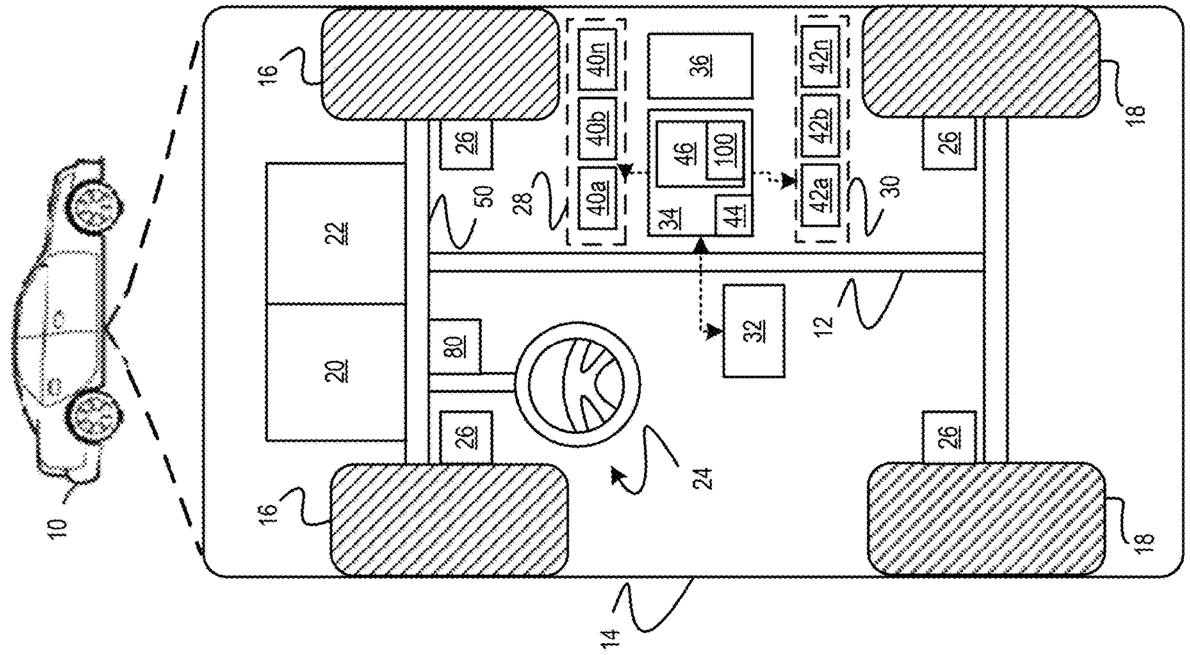
FIG. 1 is a functional block diagram of a vehicle including a cold start emission mitigation system in accordance with at least one embodiment.

Referring to FIG. 1, a functional block diagram of a vehicle 10 including a cold start emission mitigation system 100 in accordance with at least one embodiment is shown. The vehicle 10 generally includes a chassis 12, a body 14, front wheels 16, and rear wheels 18. While the vehicle 10 is depicted in the illustrated embodiment as a passenger car, the vehicle 10 may be other types of vehicles including trucks, sport utility vehicles (SUVs), and recreational vehicles (RVs).

In various embodiments, the body 14 is arranged on the chassis 12 and substantially encloses components of the vehicle 10. The body 14 and the chassis 12 may jointly form a frame. The wheels 16, 18 are each rotationally coupled to the chassis 12 near a respective corner of the body 14.

In various embodiments, the vehicle 10 is an autonomous or semi-autonomous vehicle that is automatically controlled to carry passengers and/or cargo from one place to another. For example, in an exemplary embodiment, the vehicle 10 is a so-called Level Two, Level Three, Level Four or Level Five automation system. Level two automation means the vehicle assists the driver in various driving tasks with driver supervision. Level three automation means the vehicle can take over all driving functions under certain circumstances. All major functions are automated, including braking, steering, and acceleration. At this level, the driver can fully disengage until the vehicle tells the driver otherwise. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20 a transmission system 22, a steering system 24, a braking system 26, a sensor system 28, an actuator system 30, at least one data storage device 32, at least one controller 34, and a communication system 36. The controller 34 is configured to implement an automated driving system (ADS). The propulsion system 20 is configured to generate power to propel the vehicle. The propulsion system 20 includes an internal combustion engine (ICE). The propulsion system 20 may, in various embodiments, also include an electric machine such as a traction motor, a fuel cell propulsion system, and/or any other type of propulsion configuration. The transmission system 22 is configured to transmit power from the propulsion system 20 to the vehicle wheels 16, 18 according to selectable speed ratios. According to various embodiments, the transmission system 22 may include a step-ratio automatic transmission, a continuously-variable transmission, or other appropriate transmission. The braking system 26 is configured to provide braking torque to the vehicle wheels 16, 18. The braking system 26 may, in various embodiments, include friction brakes, brake by wire, a regenerative braking system such as an electric machine, and/or other appropriate braking systems.

The steering system 24 is configured to influence a position of the of the vehicle wheels 16. While depicted as including a steering wheel and steering column, for illustrative purposes, in some embodiments contemplated within the scope of the present disclosure, the steering system 24 may not include a steering wheel and/or steering column. The steering system 24 includes a steering column coupled to an axle 50 associated with the front wheels 16 through, for example, a rack and pinion or other mechanism (not shown). Alternatively, the steering system 24 may include a steer by wire system that includes actuators associated with each of the front wheels 16.

The sensor system 28 includes one or more sensing devices 40*a*-40*n* that sense observable conditions of the exterior environment and/or the interior environment of the vehicle 10. The sensing devices 40*a*-40*n* can include, but are not limited to, radars, lidars, global positioning systems, optical cameras, thermal cameras, ultrasonic sensors, a steering wheel sensor, and/or other sensors.

The vehicle dynamics sensors provide vehicle dynamics data including longitudinal speed, yaw rate, lateral acceleration, longitudinal acceleration, etc. The vehicle dynamics sensors may include wheel sensors that measure information pertaining to one or more wheels of the vehicle 10. In one embodiment, the wheel sensors comprise wheel speed sensors that are coupled to each of the wheels 16, 18 of the vehicle 10. Further, the vehicle dynamics sensors may include one or more accelerometers (provided as part of an Inertial Measurement Unit (IMU)) that measure information pertaining to an acceleration of the vehicle 10. In various embodiments, the accelerometers measure one or more acceleration values for the vehicle 10, including latitudinal and longitudinal acceleration and yaw rate. In at least one embodiment, the vehicle dynamic sensors provide vehicle movement data.

The actuator system 30 includes one or more actuator devices 42*a*-42*n* that control one or more vehicle features such as, but not limited to, one or more vehicle wheels 16, 18 the propulsion system 20, the transmission system 22, the steering system 24, and the braking system 26. In various embodiments, the vehicle features can further include interior and/or exterior vehicle features such as, but are not limited to, doors, a trunk, and cabin features such as air, music, lighting, etc. (not numbered).

The communication system 36 is configured to wirelessly communicate information to and from other entities 48, such as but not limited to, other vehicles ("V2V" communication,) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in the ADS of the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10. In at least one embodiment, the computer-readable storage device 46 is at least one memory configured to store the cold start emission mitigation system 100.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10. In various embodiments, the controller(s) 34 are configured to implement ADS.

Figure 2:
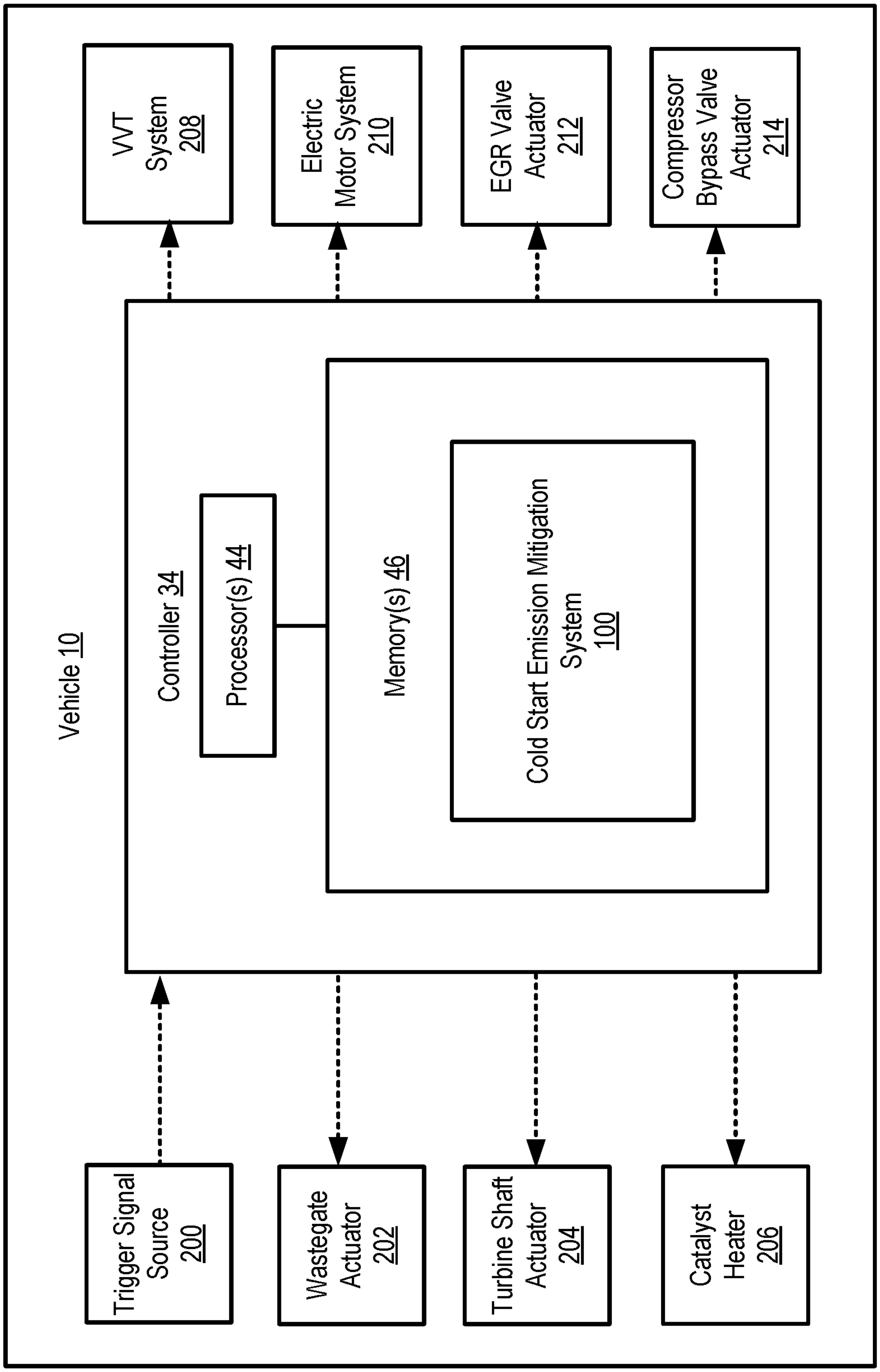
FIG. 2 is a functional block diagram of a controller including a cold start emission mitigation system in accordance with at least one embodiment.

Referring to FIG. 2, a functional block diagram of a controller 34 including a cold start emission mitigation system 100 in accordance with at least one embodiment is shown. The controller 34 includes at least one processor 44 and at least one memory 46. The at least one processor 44 is a programable device that includes one or more instructions stored in or associated with the at least one memory 46. The at least one memory 46 includes instructions that the at least one processor 44 is configured to execute. The at least one memory 46 includes an embodiment of the cold start emission mitigation system 100 that is configured to mitigate cold start emissions in a vehicle 10. In at least one embodiment, the cold start emission mitigation system 100 is configured to mitigate cold start emissions by managing turbocharger turbine rotation before fuel injection or combustion events are to occur. In one instance, the turbocharger turbine rotation occurs prior to the engine having any cylinder firing events.

The controller 34 is configured to be communicatively coupled to one or more of a trigger signal source 200, a wastegate actuator 202, a turbine shaft actuator 204, a catalyst heater 206, a variable valve timing (VVT) system 208, an electric motor system 210, an exhaust gas recirculation valve actuator 212, and a compressor bypass valve actuator 214. In at least one embodiment, the trigger signal source 200 is configured to generate a vehicle turn on signal when a vehicle 10 is turned on. In at least one embodiment, the trigger signal source 200 is an ignition system configured to generate an ignition signal. The ignition signal is the vehicle turn on signal. The controller 34 may include additional components that facilitate operation of the cold start emission mitigation system 100.

Figure 3:
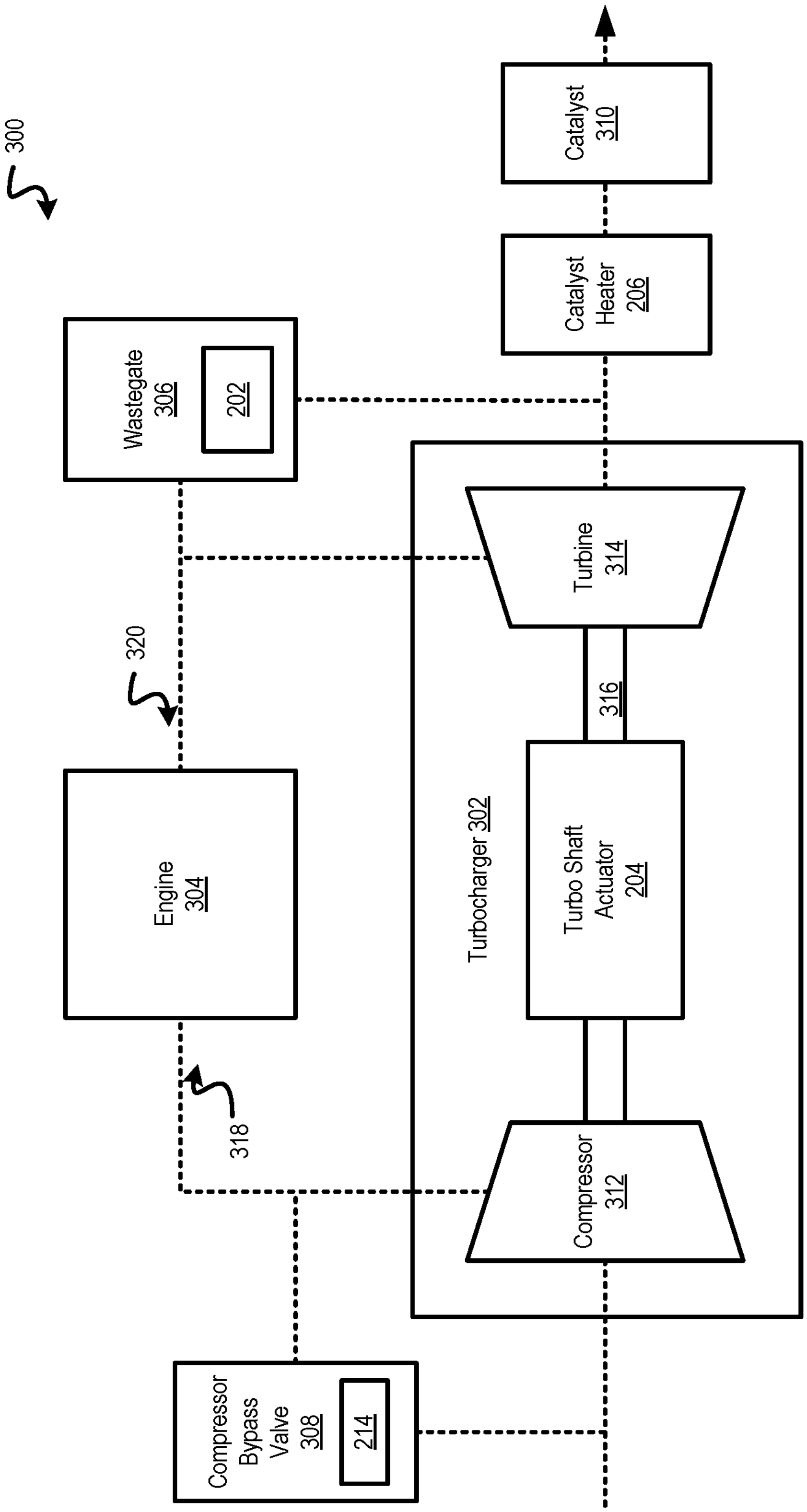
FIG. 3 is a functional block diagram of an internal combustion engine system including a first catalyst heater placement in accordance with at least one embodiment.

Referring to FIG. 3, a functional block diagram of an internal combustion engine system 300 including a first catalyst heater placement in accordance with at least one embodiment is shown, The internal combustion engine system 300 includes a turbocharger 302, an engine 304, a wastegate 306, a compressor bypass valve 308, a catalyst heater 206, and a catalyst 310. The turbocharger 302 includes a compressor 312, a turbine 314, a turbine shaft 316, and a turbine shaft actuator 204. The wastegate 306 includes a wastegate actuator 202. The compressor bypass valve 308 includes a compressor bypass valve actuator 214. In at least one embodiment, the turbo shaft actuator 204 is a motor generation unit (MGU).

The internal combustion engine system 300 includes an intake manifold 318 and an exhaust manifold 320. The intake manifold 318 fluidly couples the compressor 312 to intake valves of the cylinders of the engine 304. The exhaust manifold 320 fluidly couples exhaust valves of the cylinders of the engine 304 to the turbine 314. The internal combustion engine system 300 may include additional components that facilitate operation of the internal combustion engine system 300.

The vehicle 10 relies on the catalyst 310 to process exhaust gas generated by the engine 304 during a combustion process prior to the release of the exhaust gas as emissions from the vehicle 10, Catalysts 310 typically need to reach an operating temperature to effectively process exhaust gases. The operating temperature is referred to as a catalyst light-off temperature. The catalyst light-off temperature is generally about midway to maximum conversion efficiency temperatures, such as for example 300° C., The maximum conversion efficiency temperature may, for example, be 500° C., A cold-start of an internal combustion engine system 300 occurs when a vehicle 10 is started after the engine 304 has been turned off for several hours. At cold start-up, the vehicle 10 may emit excessive emissions until the catalyst 310 reaches the catalyst light-off temperature. The cold start emission mitigation system 100 is configured to manage rotation of the turbine 314 via the turbo shaft actuator 204 to accelerate the process of the catalyst 310 reaching the catalyst light-off temperature to mitigate cold start emissions.

The cold start emission mitigation system 100 manages the rotation of the turbine 314 to cause recirculated air to flow in a recirculation flow path. The recirculation flow path includes the exhaust manifold 320, the exhaust walls between the exhaust manifold 320 and the turbine 314, a turbine housing of the turbine 314, the exhaust walls between the turbine 314 and the wastegate 306, the exhaust walls between the wastegate 306 and the exhaust manifold 320, and the exhaust walls between the turbine 314 and the catalyst heater 206.

The recirculated air is heated by the catalyst heater 206. Heat is transferred from the heated recirculated air to the exhaust manifold 320, the exhaust walls between the exhaust manifold 320 and the turbine 314, the turbine housing of the turbine 314, the exhaust walls between the turbine 314 and the wastegate 306, the exhaust walls between the wastegate 306 and the exhaust manifold 320, and the exhaust walls between the turbine 314 and the catalyst heater 206. Having airflow near or through the catalyst heater 206 aids heat transfer from the catalyst heater 206 to the recirculated air. Having airflow near or through the catalyst heater 206 aids warm up of the catalyst 310. Turning on the catalyst heater 206 before normal engine operation with little to no airflow does not provide a means of efficiently pushing hot air near or through the catalyst 310.

An exhaust wall system includes the exhaust manifold 320, the exhaust walls between the exhaust manifold 320 and the turbine 314, the turbine housing of the turbine 314, the exhaust walls between the turbine 314 and the wastegate 306, the exhaust walls between the wastegate 306 and the exhaust manifold 320, and the exhaust walls between the turbine 314 and the catalyst heater 206. The exhaust wall between the turbine 314 and the wastegate 306 intersects the exhaust wall between the turbine 314 and the catalyst heater 206. The catalyst heater 206 is disposed after the intersection of the exhaust wall between the turbine 314 and the wastegate 306 and the exhaust wall between the turbine 314 and the catalyst heater 206, The catalyst heater 206 is disposed before the catalyst 310. Warm up of the exhaust wall system will benefit the catalyst light-off. Operation of embodiments of the cold start emission mitigation system 100 will be described in greater detail below.

Figure 4:
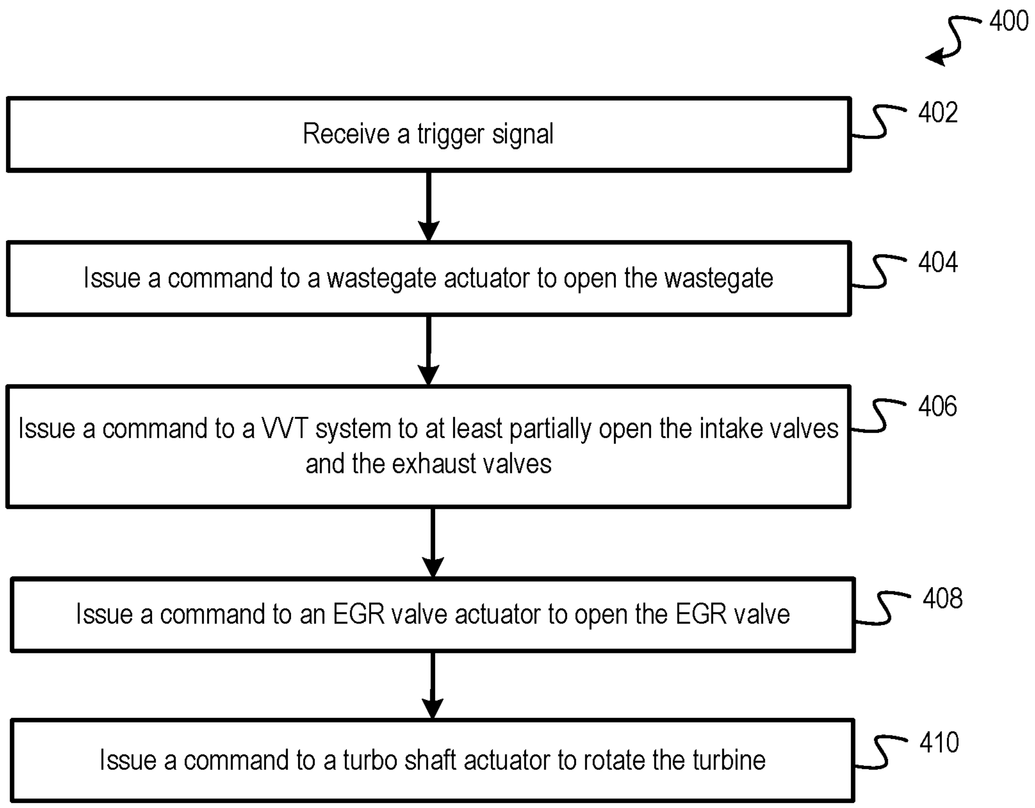
FIG. 4 is a flowchart representation of an exemplary method for mitigating cold start emissions via rotation of the turbine in the internal combustion engine system including the first catalyst heater placement of FIG. 3 in accordance with at least one embodiment.

Referring to FIG. 4, a flowchart representation of an exemplary method 400 for mitigating cold start emissions via rotation of the turbine 314 in the internal combustion engine system 300 including the first catalyst heater placement of FIG. 3 in accordance with at least one embodiment is shown. The method 400 will be described with reference to an exemplary implementation of an embodiment of a cold start emission mitigation system 100. As can be appreciated in light of the disclosure, the order of operation within the method 400 is not limited to the sequential execution as illustrated in FIG. 4 but may be performed in one or more varying orders as applicable and in accordance with the present disclosure.

At 402, the cold start emission mitigation system 100 receives a trigger signal from the trigger signal source 200 of the vehicle 10. In at least one embodiment, the trigger signal is an engine start signal. In at least one embodiment, the trigger signal source 200 is an ignition system, The ignition system turns on the vehicle 10 but does not start the engine 304 of the vehicle 10 in response to the engine start signal.

At 404, the cold start emission mitigation system 100 issues a command to the wastegate actuator 202 to open the wastegate 306, In at least one embodiment, the cold start emission mitigation system 100 issues a command to the wastegate actuator 206 to fully open the wastegate 306. In at least one embodiment, the cold start emission mitigation system 100 issues a command to the compressor bypass actuator 214 to open the compressor bypass valve 308, In at least one embodiment, the cold start emission mitigation system 100 issues a command to the compressor bypass actuator 214 to fully open the compressor bypass valve 308, The compressor bypass valve 308 is opened to protect the compressor 312 from damage due to potential compressor surge conditions.

At 406, the cold start emission mitigation system 100 issues a command to the VVT system 208 to at least partially open the intake valves and the exhaust valves of at least one of the plurality of cylinders of an internal combustion engine 304 to maximize airflow through the plurality of cylinders into the exhaust manifold 320. In at least one embodiment, the command to the VVT system 208 may be initiated and controlled during the previous cycle engine shut down routine to get the cams to the overlap condition as most VVT system 208 cannot do anything when the engine is shut down. The action to get the overlap occurs while the engine is shutting down. And it depends on where the crankshaft position ends up during shut down. A hybrid electric motor can move the crankshaft and get one or more cylinders on overlap. The electric cam phaser can move the cams a little bit. A hydraulic cam phaser cannot do this when the engine is not rotating. A hybrid electric motor can turn the crankshaft to get the cams/valves on overlap. The overlap facilitates the flow of air through the cylinders.

At 408, the cold start emission mitigation system 100 issues a command to the EGR valve actuator 212 to open the EGR valve to allow the flow of air from the intake system to the exhaust manifold 320 regardless of crankshaft position. If the crankshaft timing is such that the intake or exhaust valves are not in an overlap condition, then the EGR valve still allows flow from the intake system to the exhaust manifold 320. On a diesel engine, intake-exhaust valve area overlap is relatively small. Opening the EGR valve on a gas or diesel engine maximizes total airflow from the intake system into the exhaust manifold 320.

The engine 304 cannot flow air through the engine 304 while the crankshaft has no rotation unless the intake and exhaust valves are in the overlap condition (this is when both the intake and exhaust valves are open at the same time within a particular cylinder) and/or there is a shortcut flow around the cylinders. In this case, this would be the EGR valve. The EGR valve connects the intake system (usually upstream of the manifold) to the exhaust manifold 320.

At 410, the cold start emission mitigation system 100 issues a command to the turbo shaft actuator 204 to rotate the turbine 314. In at least embodiment, the turbo shaft actuator 204 is a motor generator unit (MGU), The MGU implements the rotation of the turbine 314 in response to the command from the cold start emission mitigation system 100, In at least one embodiment, the compressor bypass valve 308 is maintained in a closed position.

The rotation of the turbine 314 causes recirculated air to flow in the recirculation flow path. The recirculation flow path includes the exhaust manifold 320, exhaust walls between the exhaust manifold 320 and the turbine 314, a turbine housing of the turbine 314, exhaust walls between the turbine 314 and the wastegate 306, exhaust walls between the wastegate 306 and the exhaust manifold 320, and exhaust walls between the turbine 314 and the catalyst heater 206. The recirculated air is heated by the catalyst heater 206. Heat is transferred from the heated recirculated air to the exhaust manifold 320, the exhaust walls between the exhaust manifold 320 and the turbine 314, the turbine housing of the turbine 314, the exhaust walls between the turbine 314 and the wastegate 306, the exhaust walls between the wastegate 306 and the exhaust manifold 320, and the exhaust walls between the turbine 314 and the catalyst heater 206.

It is a desire to move air from the intake to the exhaust to primarily get a higher net flow through the catalyst 310. If this is not possible or is a low flow amount, then a recirculated exhaust flow is used more and more. There is typically always some recirculation flow through the wastegate 306. The rotation of the turbine 314 causes recirculated air to flow in the recirculation flow path to provide a net airflow through the catalyst 310 if air can move from the intake system to the exhaust. This can be achieved by flowing through one or more cylinders that have valves that are in an overlap condition (e.g., when both intake and exhaust valves are open on a given cylinder) or an EGR valve is open.

The exhaust wall system includes the exhaust manifold 320, the exhaust walls between the exhaust manifold 320 and the turbine 314, the turbine housing of the turbine 314, the exhaust walls between the turbine 314 and the wastegate 306, the exhaust walls between the wastegate 306 and the exhaust manifold 320, and the exhaust walls between the turbine 314 and the catalyst heater 206. Since the exhaust wall system is heated by the heated recirculated air prior to turning on the engine 304, it will take less time for the catalyst 310 to reach the catalyst light-off temperature once the engine 304 is turned on and normal engine operation is initiated. Normal engine operation indicates the occurrence of cylinder firing events. The emissions generated following use of the cold start emission mitigation system 100 to heat the exhaust wall system prior to engine cold-start are lower than emissions generated at engine cold start without the use of the cold start emission mitigation system 100, Referring to FIG. 5, a functional block diagram of an internal combustion engine system 500 including a second catalyst heater placement in accordance with at least one embodiment is shown. The internal combustion engine system 500 includes a turbocharger 502, an engine 504, a wastegate 506, a compressor bypass valve 508, a catalyst heater 206, and a catalyst 510. The turbocharger 502 includes a compressor 512, a turbine 514, a turbine shaft 516, and a turbine shaft actuator 204. The wastegate 506 includes a wastegate actuator 202. The compressor bypass valve 508 includes a compressor bypass valve actuator 214. In at least one embodiment, the turbo shaft actuator 204 is a motor generation unit (MGU).

The internal combustion engine system 500 includes an intake manifold 518 and an exhaust manifold 520. The intake manifold 518 fluidly couples the compressor 512 to intake valves of the cylinders of the engine 504. The exhaust manifold 520 fluidly couples exhaust valves of the cylinders of the engine 504 to the turbine 514. The internal combustion engine system 500 may include additional components that facilitate operation of the internal combustion engine system 500.

The vehicle 10 relies on the catalyst 510 to process exhaust gas generated by the engine 504 during a combustion process prior to the release of the exhaust gas as emissions from the vehicle 10, Catalysts 510 typically need to reach an operating temperature to effectively process exhaust gases. The operating temperature is referred to as a catalyst light-off temperature. The catalyst light-off temperature is generally about midway to maximum conversion efficiency temperatures, such as for example 300° C., The maximum conversion efficiency temperature may, for example, be 500° C., A cold-start of an internal combustion engine system 500 occurs when a vehicle 10 is started after the engine 504 has been turned off for several hours. At cold start-up, the vehicle 10 may emit excessive emissions until the catalyst 510 reaches the catalyst light-off temperature. The cold start emission mitigation system 100 is configured to manage rotation of the turbine 514 via the turbo shaft actuator 204 to accelerate the process of the catalyst 510 reaching the catalyst light-off temperature to mitigate cold start emissions.

The cold start emission mitigation system 100 manages the rotation of the turbine 514 to cause recirculated air to flow in a recirculation flow path. The recirculation flow path includes the exhaust manifold 520, the exhaust walls between the exhaust manifold 520 and the turbine 514, the turbine housing of the turbine 514, the exhaust walls between the turbine 514 and the catalyst heater 206, the exhaust walls between the catalyst heater 206 and the wastegate 506, the exhaust walls between the wastegate 506 and the exhaust manifold 520, and the exhaust walls between the catalyst heater 206 and the catalyst 510.

The recirculated air is heated by the catalyst heater 206 disposed in the recirculation flow path. Locating the catalyst heater 206 within the recirculation flow path increases heat transfer from the catalyst heater 206 to the air stream. The recirculation flow path is adjacent a side of the catalyst 510. Heat is transferred from the heated recirculated air to the exhaust manifold 520, the exhaust walls between the exhaust manifold 520 and the turbine 514, the turbine housing of the turbine 514, the exhaust walls between the turbine 514 and the catalyst heater 206, the exhaust walls between the catalyst heater 206 and the wastegate 506, the exhaust walls between the wastegate 506 and the exhaust manifold 520, the exhaust walls between the catalyst heater 206 and the catalyst 510, and the catalyst 510 via the side of the catalyst 510 adjacent the recirculation flow path.

An exhaust wall system includes the exhaust manifold 520, the exhaust walls between the exhaust manifold 520 and the turbine 514, the turbine housing of the turbine 514, the exhaust walls between the turbine 514 and the catalyst heater 206, the exhaust walls between the catalyst heater 206 and the wastegate 506, the exhaust walls between the wastegate 506 and the exhaust manifold 520, and the exhaust walls between the catalyst heater 206 and the catalyst 510.

The exhaust wall between the catalyst heater 206 and the wastegate 506 intersects the exhaust wall between the catalyst heater 206 and the catalyst 510, The catalyst 510 is disposed before the intersection of the exhaust wall between the catalyst heater 206 and the wastegate 506 and the exhaust wall between the catalyst heater 206 and the catalyst 510, Warm up of the exhaust wall system and the catalyst 510 will benefit the catalyst light-off. Operation of embodiments of the cold start emission mitigation system 100 will be described in greater detail below.

Figure 5:
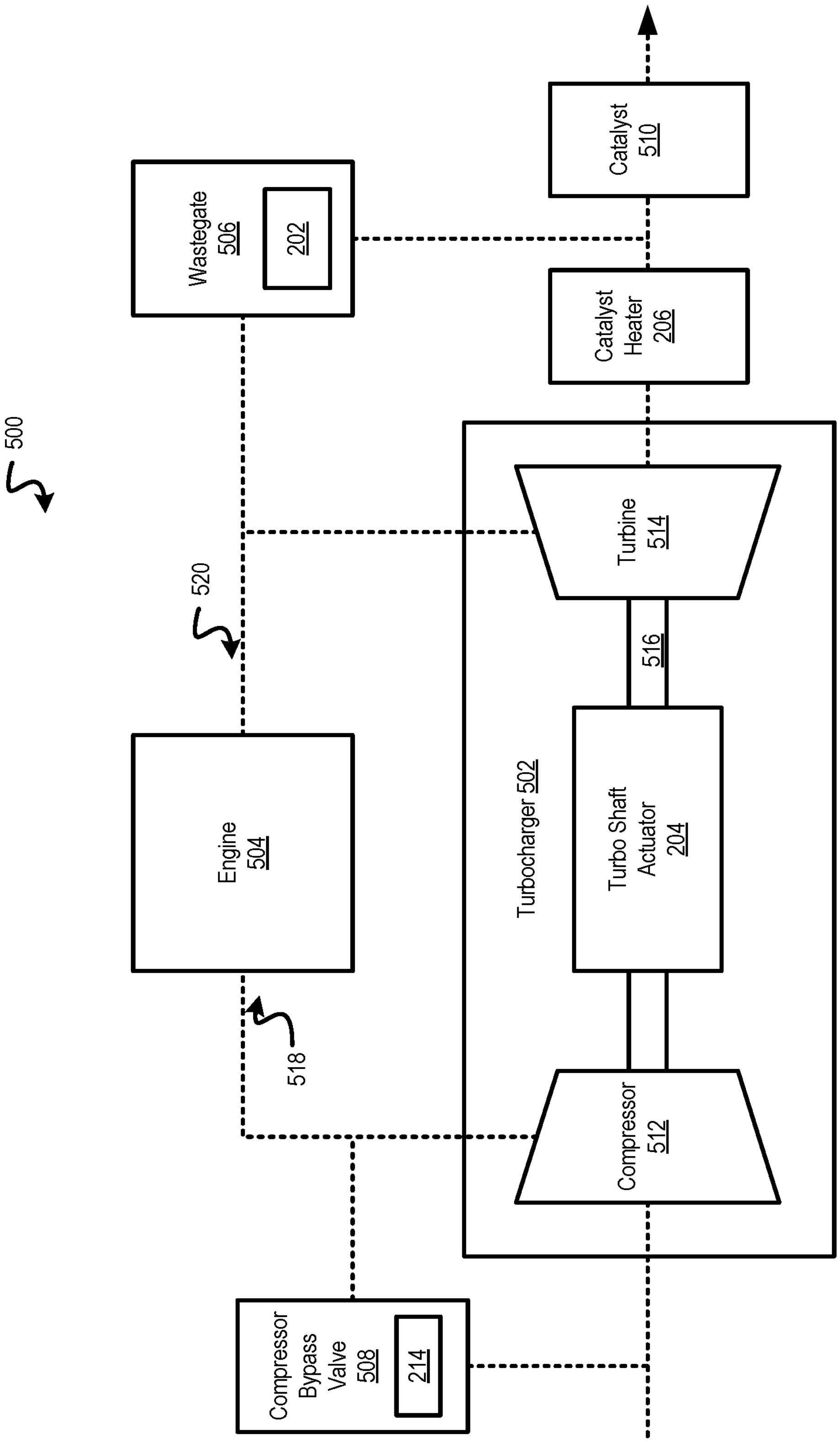
FIG. 5 is a functional block diagram of an internal combustion engine system including a second catalyst heater placement in accordance with at least one embodiment.
Figure 6:
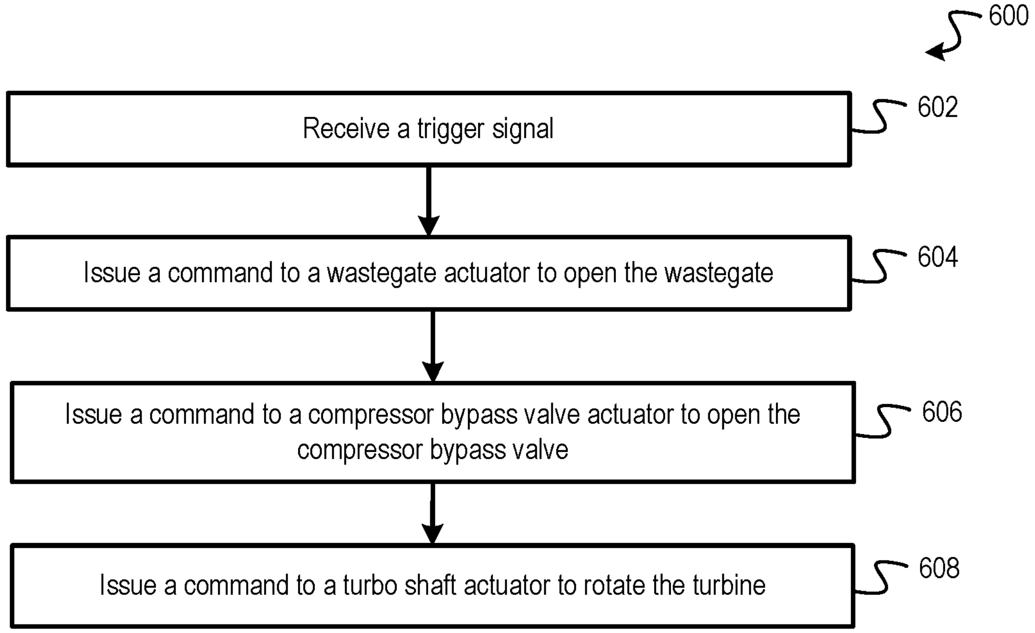
FIG. 6 is a flowchart representation of an exemplary method for mitigating cold start emissions via rotation of the turbine in the internal combustion engine system including the second catalyst heater placement of FIG. 5 in accordance with at least one embodiment.

Referring to FIG. 6, a flowchart representation of an exemplary method 600 for mitigating cold start emissions via rotation of the turbine 514 in the internal combustion engine system 500 including the second catalyst heater placement of FIG. 5 in accordance with at least one embodiment is shown. The method 600 will be described with reference to an exemplary implementation of an embodiment of a cold start emission mitigation system 100. As can be appreciated in light of the disclosure, the order of operation within the method 600 is not limited to the sequential execution as illustrated in FIG. 6 but may be performed in one or more varying orders as applicable and in accordance with the present disclosure.

At 602, the cold start emission mitigation system 100 receives a trigger signal from the trigger signal source 200 of the vehicle 10. In at least one embodiment, the trigger signal is an engine start signal. In at least one embodiment, the trigger signal source 200 is an ignition system, The ignition system turns on the vehicle 10 but does not start the engine 304 of the vehicle 10 in response to the engine start signal.

At 604, the cold start emission mitigation system 100 issues a command to the wastegate actuator 202 to open the wastegate 506, In at least one embodiment, the cold start emission mitigation system 100 issues a command to the wastegate actuator 206 to fully open the wastegate 506.

At 606, the cold start emission mitigation system 100 issues a command to the compressor bypass actuator 214 to open the compressor bypass valve 508, In at least one embodiment, the cold start emission mitigation system 100 issues a command to the compressor bypass actuator 214 to fully open the compressor bypass valve 508, The compressor bypass valve 508 is opened to protect the compressor 512 from damage due to potential surge compressor conditions.

At 608, the cold start emission mitigation system 100 issues a command to the turbo shaft actuator 204 to rotate the turbine 514. In at least embodiment, the turbo shaft actuator 204 is a motor generator unit (MGU), The MGU implements the rotation of the turbine 514 in response to the command from the cold start emission mitigation system 100.

The rotation of the turbine 514 causes recirculated air to flow in the recirculation flow path. The recirculation flow path includes the exhaust manifold 520, the exhaust walls between the exhaust manifold 520 and the turbine 514, the turbine housing of the turbine 514, the exhaust walls between the turbine 514 and the catalyst heater 206, the exhaust walls between the catalyst heater 206 and the wastegate 506, the exhaust walls between the wastegate 506 and the exhaust manifold 520, and the exhaust walls between the catalyst heater 206 and the catalyst 510, A side of the catalyst 510 is disposed adjacent to the recirculation flow path, The recirculated air flows past the side of the catalyst 510.

The recirculated air is heated by the catalyst heater 206 as the recirculated air flows through the catalyst heater 206. Heat is transferred from the heated recirculated air to the exhaust manifold 520, the exhaust walls between the exhaust manifold 520 and the turbine 514, the turbine housing of the turbine 514, the exhaust walls between the turbine 514 and the catalyst heater 206, the exhaust walls between the catalyst heater 206 and the wastegate 506, the exhaust walls between the wastegate 506 and the exhaust manifold 520, the exhaust walls between the catalyst heater 206 and the catalyst 510, and the catalyst 510 via the side of the catalyst 510 adjacent the recirculation flow path.

The exhaust wall system includes the exhaust manifold 520, the exhaust walls between the exhaust manifold 520 and the turbine 514, the turbine housing of the turbine 514, the exhaust walls between the turbine 514 and the catalyst heater 206, the exhaust walls between the catalyst heater 206 and the wastegate 506, the exhaust walls between the wastegate 506 and the exhaust manifold 520, and the exhaust walls between the catalyst heater 206 and the catalyst 510. Since the exhaust wall system and the catalyst 510 is heated by the heated recirculated air prior to turning on the engine 504, it will take less time for the catalyst 510 to reach the catalyst light-off temperature once the engine 504 is turned on and normal engine operation is initiated. Normal engine operation indicates the occurrence of cylinder firing events. The emissions generated following use of the cold start emission mitigation system 100 to heat the exhaust wall system and the catalyst 510 prior to engine cold-start are lower than emissions generated at engine cold start without the use of the cold start emission mitigation system 100, Referring to FIG. 7, a functional block diagram of an internal combustion engine system 700 including a third catalyst heater placement with respect to the wastegate channel exit position in accordance with at least one embodiment is shown. The internal combustion engine system 700 includes a turbocharger 702, an engine 704, a wastegate 706, a compressor bypass valve 708, a catalyst heater 206, and a catalyst. The catalyst includes a first catalyst brick 710*a* and a second catalyst brick 710*b*. turbocharger 702 includes a compressor 712, a turbine 714, a turbine shaft 716, and a turbine shaft actuator 204. The wastegate 706 includes a wastegate actuator 202. The compressor bypass valve 708 includes a compressor bypass valve actuator 214. In at least one embodiment, the turbo shaft actuator 204 is a motor generation unit (MGU).

The internal combustion engine system 700 includes an intake manifold 718 and an exhaust manifold 720. The intake manifold 718 fluidly couples the compressor 712 to intake valves of the cylinders of the engine 704. The exhaust manifold 720 fluidly couples exhaust valves of the cylinders of the engine 704 to the turbine 714. The internal combustion engine system 700 may include additional components that facilitate operation of the internal combustion engine system 700.

The vehicle 10 relies on the catalyst to process exhaust gas generated by the engine 704 during a combustion process prior to the release of the exhaust gas as emissions from the vehicle 10, Catalysts typically need to reach an operating temperature to effectively process exhaust gases. The operating temperature is referred to as a catalyst light-off temperature. The catalyst light-off temperature is generally about midway to maximum conversion efficiency temperatures, such as for example 300° C., The maximum conversion efficiency temperature may, for example, be 500° C., A cold-start of an internal combustion engine system 700 occurs when a vehicle 10 is started after the engine 704 has been turned off for several hours. At cold start-up, the vehicle 10 may emit excessive emissions until the catalyst reaches the catalyst light-off temperature. The cold start emission mitigation system 100 is configured to manage rotation of the turbine 714 via the turbo shaft actuator 204 to accelerate the process of the catalyst reaching the catalyst light-off temperature to mitigate cold start emissions.

The cold start emission mitigation system 100 manages the rotation of the turbine 714 to cause recirculated air to flow in a recirculation flow path. The recirculation flow path includes the exhaust manifold 720, the exhaust walls between the exhaust manifold 720 and the turbine 714, the turbine housing of the turbine 714, the exhaust walls between the turbine 714 and the catalyst heater 206, the exhaust walls between the catalyst heater 206 and the first catalyst brick 710*a*, the exhaust walls between the first catalyst brick 710*a* and the wastegate 706, and the exhaust walls between the wastegate 706 and the exhaust manifold 720. The catalyst heater 206 and the first catalyst brick 710*a* are disposed within the recirculation flow path. The second catalyst brick 710*b* is disposed outside the recirculation flow path.

The recirculated air is heated by the catalyst heater 206 as the recirculated air flows through the catalyst heater 206. Heat is transferred from the heated recirculated air to the exhaust manifold 720, the exhaust walls between the exhaust manifold 720 and the turbine 714, the turbine housing of the turbine 714, the exhaust walls between the turbine 714 and the catalyst heater 206, the exhaust walls between the catalyst heater 206 and the first catalyst brick 710*a*, the exhaust walls between the first catalyst brick 710*a* and the wastegate 706, the exhaust walls between the wastegate 706 and the exhaust manifold 720, and the first catalyst brick 710*a*. The recirculated air flows through the first catalyst brick 710*a*. A side of the second catalyst brick 710*b* is disposed adjacent to the recirculation flow path, The heated recirculated air flows past the side of the second catalyst brick 710*b*, Heat is transferred from the heated recirculated air to the second catalyst brick 710*b* via the side of the second catalyst brick 710*b*.

An exhaust wall system includes the exhaust manifold 720, the exhaust walls between the exhaust manifold 720 and the turbine 714, the turbine housing of the turbine 714, the exhaust walls between the turbine 714 and the catalyst heater 206, the exhaust walls between the catalyst heater 206 and the first catalyst brick 710*a*, the exhaust walls between the first catalyst brick 710*a* and the wastegate 706, and the exhaust walls between the wastegate 706 and the exhaust manifold 720. Warm up of the exhaust wall system, the first catalyst brick 710*a*, and the second catalyst brick 710*b* will benefit the catalyst light-off. Operation of embodiments of the cold start emission mitigation system 100 will be described in greater detail below.

Figure 7:
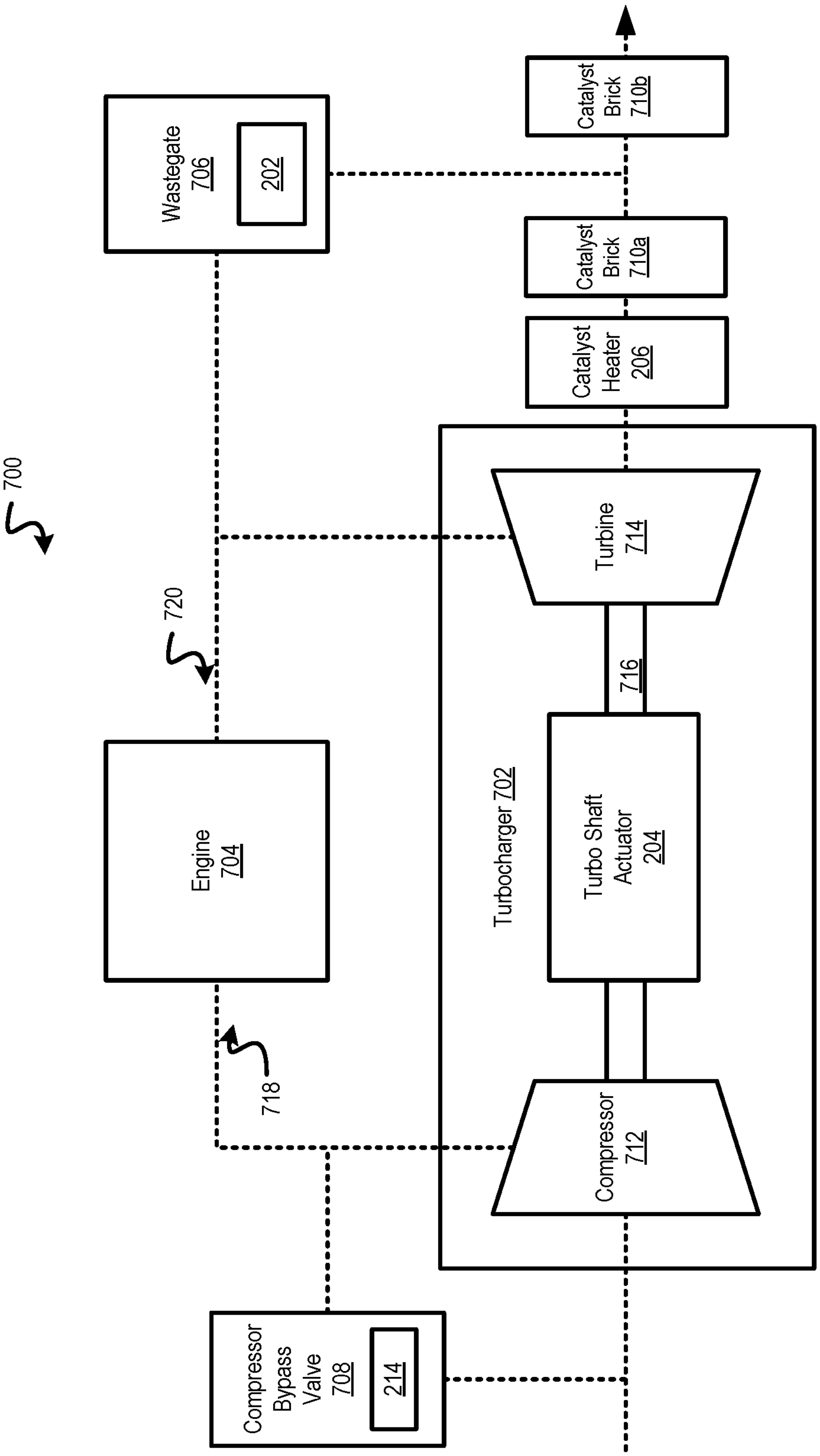
FIG. 7 is a functional block diagram of an internal combustion engine system including a third catalyst heater placement in accordance with at least one embodiment.
Figure 8:
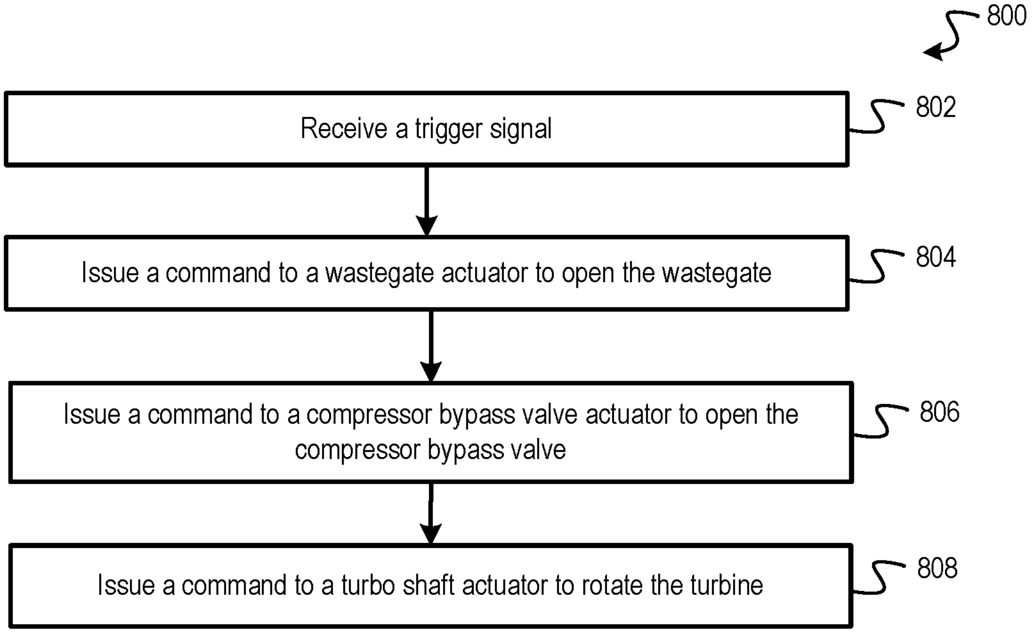
FIG. 8 is a flowchart representation of an exemplary method for mitigating cold start emissions via rotation of the turbine in the internal combustion engine system including the third catalyst heater placement of FIG. 7 in accordance with at least one embodiment.

Referring to FIG. 8, a flowchart representation of an exemplary method 800 for mitigating cold start emissions via rotation of the turbine 714 in the internal combustion engine system 700 including the third catalyst heater placement of FIG. 7 in accordance with at least one embodiment is shown. The method 800 will be described with reference to an exemplary implementation of an embodiment of a cold start emission mitigation system 100. As can be appreciated in light of the disclosure, the order of operation within the method 700 is not limited to the sequential execution as illustrated in FIG. 7 but may be performed in one or more varying orders as applicable and in accordance with the present disclosure.

At 802, the cold start emission mitigation system 100 receives a trigger signal from the trigger signal source 200 of the vehicle 10. In at least one embodiment, the trigger signal is an ignition turn on signal. In at least one embodiment, the trigger signal source 200 is an ignition system, The ignition system turns on the vehicle 10 but does not start the engine 704 of the vehicle 10.

At 804, the cold start emission mitigation system 100 issues a command to the wastegate actuator 202 to open the wastegate 706, In at least one embodiment, the cold start emission mitigation system 100 issues a command to the wastegate actuator 206 to fully open the wastegate 706.

At 806, the cold start emission mitigation system 100 issues a command to the compressor bypass actuator 214 to open the compressor bypass valve 708, In at least one embodiment, the cold start emission mitigation system 100 issues a command to the compressor bypass actuator 214 to fully open the compressor bypass valve 708. The compressor bypass valve 708 is opened to protect the compressor 712 from damage due to potential surge compressor conditions.

At 808, the cold start emission mitigation system 100 issues a command to the turbo shaft actuator 204 to rotate the turbine 714. In at least embodiment, the turbo shaft actuator 204 is a motor generator unit (MGU), The MGU implements the rotation of the turbine 714 in response to the command from the cold start emission mitigation system 100.

The rotation of the turbine 714 causes recirculated air to flow in the recirculation flow path. The recirculation flow path includes the exhaust manifold 720, the exhaust walls between the exhaust manifold 720 and the turbine 714, the turbine housing of the turbine 714, the exhaust walls between the turbine 714 and the catalyst heater 206, the exhaust walls between the catalyst heater 206 and the first catalyst brick 710*a*, the exhaust walls between the first catalyst brick 710*a* and the wastegate 706, and the exhaust walls between the wastegate 706 and the exhaust manifold 720. The first catalyst brick 710*a* and the catalyst heater 206 are disposed within the recirculation flow path. The second catalyst brick 710*b* is disposed outside the recirculation flow path.

The recirculated air is heated by the catalyst heater 206 as the recirculated air flows through the catalyst heater 206. Heat is transferred from the heated recirculated air to the exhaust manifold 720, the exhaust walls between the exhaust manifold 720 and the turbine 714, the turbine housing of the turbine 714, the exhaust walls between the turbine 714 and the catalyst heater 206, the exhaust walls between the catalyst heater 206 and the first catalyst brick 710*a*, the exhaust walls between the first catalyst brick 710*a* and the wastegate 706, the exhaust walls between the wastegate 706 and the exhaust manifold 720, and the first catalyst brick 710*a*. The recirculated air flows through the first catalyst brick 710*a*. A side of the second catalyst brick 710*b* is disposed adjacent to the recirculation flow path, The heated recirculated air flows past the side of the second catalyst brick 710*b*, Heat is transferred from the heated recirculated air to the second catalyst brick 710*b* via the side of the second catalyst brick 710*b*.

The exhaust wall system includes the exhaust manifold 720, the exhaust walls between the exhaust manifold 720 and the turbine 714, the turbine housing of the turbine 714, the exhaust walls between the turbine 714 and the catalyst heater 206, the exhaust walls between the catalyst heater 206 and the first catalyst brick 710*a*, the exhaust walls between the first catalyst brick 710*a* and the wastegate 706, and the exhaust walls between the wastegate 706 and the exhaust manifold 720. Since the exhaust wall system and the catalyst are heated by the heated recirculated air prior to turning on the engine 704, it will take less time for the catalyst to reach the catalyst light-off temperature once normal engine operation is initiated. Normal engine operation indicates the occurrence of cylinder firing events. The emissions generated following use of the emission mitigation system 100 to heat the exhaust wall system prior to engine cold-start are lower than emissions generated at engine cold start without the use of the emission mitigation system 100, Having airflow near or through the catalyst heater 206 aids heat transfer from the catalyst heater 206 to the recirculated air. Having airflow near or through the catalyst heater 206 aids warm up of the catalyst 310, 410, 510. Turning on the catalyst heater 206 before normal engine operation with little to no airflow does not provide a means of efficiently pushing hot air near or through the catalyst 310, 510, 710*a*, 710*b*.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of mitigating cold start emissions in a vehicle including a catalyst heater via rotation of turbocharger turbine comprising:

issuing, by the controller, a first command to a variable valve timing (VVT) system to at least partially open intake valves and exhaust valves of a plurality of cylinders of an engine during a previous shut down routine of the engine to enable air to flow from an intake system through the plurality of cylinders to an exhaust manifold;

receiving, at a controller, a trigger signal from a trigger signal source of the vehicle, wherein an ignition system turns on the vehicle and does not start the engine in response to the trigger signal;

issuing, by the controller, a second command to a wastegate actuator to open a wastegate responsive to the trigger signal;

issuing, by the controller, a third command to an exhaust gas recirculation (EGR) valve actuator to open an EGR valve to enable the air to flow from the intake system to the exhaust manifold via the EGR valve in response to the trigger signal;

issuing, by the controller, a fourth command to a turbo shaft actuator to rotate a turbine of a turbocharger responsive to the trigger signal, wherein rotation of the turbine occurs prior to the engine having any cylinder firing events; and issuing, by the controller, a fifth command to the catalyst heater to turn on the catalyst heater responsive to the trigger signal, the catalyst heater being disposed between the turbine and a first catalyst brick, wherein:

the rotation of the turbine causes the air to flow in a recirculation flow path as recirculated air;

the recirculation flow path comprises the exhaust manifold, exhaust walls between the exhaust manifold and the turbine, a turbine housing of the turbine, exhaust walls between the turbine and the wastegate, exhaust walls between the wastegate and the exhaust manifold, and exhaust walls between the turbine and the catalyst heater;

the first catalyst brick is disposed outside the recirculation flow path;

the recirculated air is heated by the catalyst heater; and heat is transferred from the heated recirculated air to the exhaust manifold, the exhaust walls between the exhaust manifold and the turbine, the turbine housing of the turbine, the exhaust walls between the turbine and the wastegate, the exhaust walls between the wastegate and the exhaust manifold, and the exhaust walls between the turbine and the catalyst heater prior to turning on the engine:

The recirculation flow path comprises the exhaust manifold, the exhaust walls between the exhaust manifold and the turbine, the turbine housing of the turbine, the exhaust walls between the turbine and the catalyst heater, exhaust walls between the catalyst heater and a second catalyst brick, exhaust walls between the second catalyst brick and the wastegate, and the exhaust walls between the wastegate and the exhaust manifold;

the second catalyst brick is disposed inside the recirculation flow path; and heat is transferred from the heated recirculated air to the exhaust manifold, the exhaust walls between the exhaust manifold and the turbine, the turbine housing of the turbine, the exhaust walls between the turbine and the catalyst heater, the exhaust walls between the catalyst heater and the second catalyst brick, the exhaust walls between the second catalyst brick and the wastegate, the exhaust walls between the wastegate and the exhaust manifold, and the second catalyst brick.

2. The method of claim 1, wherein issuing by the controller, the second command to the wastegate actuator to open the wastegate comprises issuing by the controller, the second command to the wastegate actuator to fully open the wastegate.

3. The method of claim 1, further comprising issuing, by the controller, a sixth command to a compressor bypass valve actuator to open a compressor bypass valve responsive to the trigger signal.

4. The method of claim 1, wherein:

the recirculation flow path is adjacent a first side of the first catalyst brick; and heat is transferred from the heated recirculated air to the exhaust manifold, the exhaust walls between the exhaust manifold and the turbine, the turbine housing of the turbine, the exhaust walls between the turbine and the catalyst heater, the exhaust walls between the catalyst heater and the wastegate, the exhaust walls between the wastegate and the exhaust manifold, the exhaust walls between the catalyst heater and the first catalyst brick, and the first catalyst brick via the first side of the first catalyst brick.

5. The method of claim 1, wherein the first catalyst brick comprises an oxidation catalyst.

6. The method of claim 1, wherein the turbo shaft actuator is a motor generator unit (MGU).

7. A system for mitigating cold start emissions generated by a vehicle including a catalyst heater via rotation of turbocharger turbine, comprising:

at least one processor; and at least one memory communicatively coupled to the at least one processor, the at least one memory comprising instructions that upon execution by the at least one processor, causes the at least one processor to:

issue a first command to a variable valve timing (VVT) system to at least partially open intake valves and exhaust valves of a plurality of cylinders of an engine during a previous shut down routine of the engine to enable air to flow from an intake system through the plurality of cylinders to an exhaust manifold;

receive a trigger signal from a trigger signal source of the vehicle, wherein an ignition system turns on the vehicle and does not start the engine in response to the trigger signal;

issue a second command to a wastegate actuator to open a wastegate responsive to the trigger signal;

issue a third command to an exhaust gas recirculation (EGR) valve actuator to open an EGR valve to enable the air to flow from the intake system to the exhaust manifold via the EGR valve in response to the trigger signal;

issue a fourth command to a turbo shaft actuator to rotate a turbine of a turbocharger responsive to the trigger signal, wherein rotation of the turbine occurs prior to the engine having any cylinder firing events; and issue a fifth command to the catalyst heater to turn on the catalyst heater responsive to the trigger signal, the catalyst heater being disposed between the turbine and a first catalyst brick, wherein:

the rotation of the turbine causes the air to flow in a recirculation flow path as recirculated air;

the first catalyst brick is disposed outside the recirculation flow path;

the recirculation flow path comprises the exhaust manifold, exhaust walls between the exhaust manifold and the turbine, a turbine housing of the turbine, exhaust walls between the turbine and the wastegate, exhaust walls between the wastegate and the exhaust manifold, and exhaust walls between the turbine and the catalyst heater;

the recirculated air is heated by the catalyst heater; and heat is transferred from the heated recirculated air to the exhaust manifold, the exhaust walls between the exhaust manifold and the turbine, the turbine housing of the turbine, the exhaust walls between the turbine and the wastegate, the exhaust walls between the wastegate and the exhaust manifold, and the exhaust walls between the turbine and the catalyst heater prior to turning on the engine;

the recirculation flow path comprises the exhaust manifold, the exhaust walls between the exhaust manifold and the turbine, the turbine housing of the turbine, the exhaust walls between the turbine and the catalyst heater, exhaust walls between the catalyst heater and the first catalyst brick, exhaust walls between a second catalyst brick and the wastegate, and the exhaust walls between the wastegate and the exhaust manifold;

the second catalyst brick is disposed inside the recirculation flow path; and heat is transferred from the heated recirculated air to the exhaust manifold, the exhaust walls between the exhaust manifold and the turbine, the turbine housing of the turbine, the exhaust walls between the turbine and the catalyst heater, the exhaust walls between the catalyst heater and the second catalyst brick, the exhaust walls between the second catalyst brick and the wastegate, the exhaust walls between the wastegate and the exhaust manifold, and the first second catalyst brick.

8. The system of claim 7, wherein the at least one memory further comprises instructions that upon execution by the at least one processor, causes the at least one processor to issue a seventh control signal sixth command to a compressor bypass valve actuator to open a compressor bypass valve responsive to the trigger signal.

9. The system of claim 7, wherein:

the recirculation flow path is adjacent a first side of the first catalyst brick; and heat is transferred from the heated recirculated air to the exhaust manifold, the exhaust walls between the exhaust manifold and the turbine, the turbine housing of the turbine, the exhaust walls between the turbine and the catalyst heater, the exhaust walls between the catalyst heater and the wastegate, the exhaust walls between the wastegate and the exhaust manifold, the exhaust walls between the catalyst heater and the first catalyst brick, and the first catalyst brick via the first side of the first catalyst brick.

10. A vehicle including a cold start emissions mitigation system comprising:

at least one processor; and at least one memory communicatively coupled to the at least one processor, the at least one memory comprising instructions that upon execution by the at least one processor, causes the at least one processor to:

issue a first command to a variable valve timing (VVT) system to at least partially open intake valves and exhaust valves of a plurality of cylinders of an engine during a previous shut down routine of the engine to enable air to flow from an intake system through the plurality of cylinders to an exhaust manifold;

receive a trigger signal from a trigger signal source of the vehicle, wherein an ignition system turns on the vehicle and does not start the engine in response to the trigger signal;

issue a second command to a wastegate actuator to open a wastegate responsive to the trigger signal;

issue a third command to an exhaust gas recirculation (EGR) valve actuator to open an EGR valve to enable the air to flow from the intake system to the exhaust manifold via the EGR valve in response to the trigger signal;

issue a fourth command to a turbo shaft actuator to rotate a turbine of a turbocharger responsive to the trigger signal, wherein rotation of the turbine occurs prior to the engine having any cylinder firing events;

and issue a fifth command to the catalyst heater to turn on the catalyst heater responsive to the trigger signal, the catalyst heater being disposed between the turbine and a first catalyst brick, wherein:

the rotation of the turbine causes the air to flow in a recirculation flow path as recirculated air;

the first catalyst brick is disposed outside the recirculation flow path;

the recirculation flow path comprises the exhaust manifold, exhaust walls between the exhaust manifold and the turbine, a turbine housing of the turbine, exhaust walls between the turbine and the wastegate, exhaust walls between the wastegate and the exhaust manifold, and exhaust walls between the turbine and the catalyst heater;

the recirculated air is heated by the catalyst heater; and heat is transferred from the heated recirculated air to the exhaust manifold, the exhaust walls between the exhaust manifold and the turbine, the turbine housing of the turbine, the exhaust walls between the turbine and the wastegate, the exhaust walls between the wastegate and the exhaust manifold, and the exhaust walls between the turbine and the catalyst heater prior to turning on the engine:

The recirculation flow path comprises the exhaust manifold, the exhaust walls between the exhaust manifold and the turbine, the turbine housing of the turbine, the exhaust walls between the turbine and the catalyst heater, exhaust walls between the catalyst heater and the first catalyst brick, exhaust walls between the second catalyst brick and the wastegate, and the exhaust walls between the wastegate and the exhaust manifold;

the second catalyst brick is disposed inside the recirculation flow path; and heat is transferred from the heated recirculated air to the exhaust manifold, the exhaust walls between the exhaust manifold and the turbine, the turbine housing of the turbine, the exhaust walls between the turbine and the catalyst heater, the exhaust walls between the catalyst heater and the second catalyst brick, the exhaust walls between the second catalyst brick and the wastegate, the exhaust walls between the wastegate and the exhaust manifold, and the second catalyst brick.

11. The vehicle of claim 10, wherein the at least one memory further comprises instructions that upon execution by the at least one processor, causes the at least one processor to issue a sixth command to a compressor bypass valve actuator to open a compressor bypass valve responsive to the trigger signal.

12. The vehicle of claim 10, wherein:

the recirculation flow path is adjacent a first side of the first catalyst brick; and heat is transferred from the heated recirculated air to the exhaust manifold, the exhaust walls between the exhaust manifold and the turbine, the turbine housing of the turbine, the exhaust walls between the turbine and the catalyst heater, the exhaust walls between the catalyst heater and the wastegate, the exhaust walls between the wastegate and the exhaust manifold, the exhaust walls between the catalyst heater and the first catalyst brick, and the first catalyst brick via the first side of the first catalyst brick.

13. The vehicle of claim 10, wherein the at least one memory further comprises instructions that upon execution by the at least one processor, causes the at least one processor to issue the second command to the wastegate actuator to fully open the wastegate.

14. The vehicle of claim 10, wherein the first catalyst brick comprises an oxidation catalyst.

15. The vehicle of claim 10, wherein the turbo shaft actuator is a motor generator unit (MGU).

16. The system of claim 7, wherein the first catalyst brick comprises an oxidation catalyst.

17. The system of claim 7, wherein the turbo shaft actuator is a motor generator unit (MGU).

* * * * *